United States Patent [19]

Braun

[11] 4,107,241

[45] Aug. 15, 1978

[54] CONTACTING ARRANGEMENT FOR MASS TRANSFER OPERATIONS

[75] Inventor: Roland Braun, Ludwigshafen am Rhein, Fed. Rep. of Germany

[73] Assignee: Raschig G.m.b.H., Ludwigshafen am Rhein, Fed. Rep. of Germany

[21] Appl. No.: 731,623

[22] Filed: Oct. 12, 1976

[51] Int. Cl.² .............................................. B01F 3/04
[52] U.S. Cl. ................................ 261/79 A; 261/112; 261/DIG. 72; 428/116
[58] Field of Search .................... 261/111, 112, 94–98, 261/DIG. 72, DIG. 11, 79 A; 210/150, 151; 428/116–120

[56] References Cited

U.S. PATENT DOCUMENTS

| 2,197,970 | 4/1940 | Elmer | 261/DIG. 11 |
|---|---|---|---|
| 2,206,440 | 7/1940 | Walker | 261/112 |
| 3,227,429 | 1/1966 | Renzi | 210/150 X |
| 3,266,787 | 8/1966 | Eckert | 261/94 |
| 3,340,341 | 9/1967 | Bruder | 261/112 X |
| 3,450,393 | 6/1969 | Munters | 261/112 |
| 3,820,353 | 6/1974 | Shiraishi et al. | 261/DIG. 11 |

FOREIGN PATENT DOCUMENTS

| 961,875 | 5/1950 | France | 261/DIG. 11 |
|---|---|---|---|
| 2,060,178 | 11/1971 | Fed. Rep. of Germany | 261/112 |
| 2,516,078 | 10/1976 | Fed. Rep. of Germany | 261/112 |
| 647,647 | 12/1950 | United Kingdom | 261/DIG. 11 |

*Primary Examiner*—Richard L. Chiesa

[57] ABSTRACT

Each of a plurality of stacked contacting grates comprises a set of laterally spaced apart, parallel first strips and a set of laterally spaced apart second strips, each of which has a longitudinal direction which is transverse to the longitudinal direction of said first strips of the same grate. Each of said second strips having at right angles to its longitudinal direction a direction which includes an oblique angle with the longitudinal direction of said first strips of the same grate. Said oblique angle is in the same sense for all said second strips of a grate and in opposite senses for the second strips of adjacent grates, whereby said second strips of all said grates define zig-zag flow passages. Each strip of each of said sets intersects all strips of the other set of the same grate. At least part of said strips of each of said grates are formed with holes. Said second strips are adapted to repeatedly deflect vapors rising between said second strips and to be wetted by a liquid flowing countercurrent to said vapors and in contact therewith.

6 Claims, 6 Drawing Figures

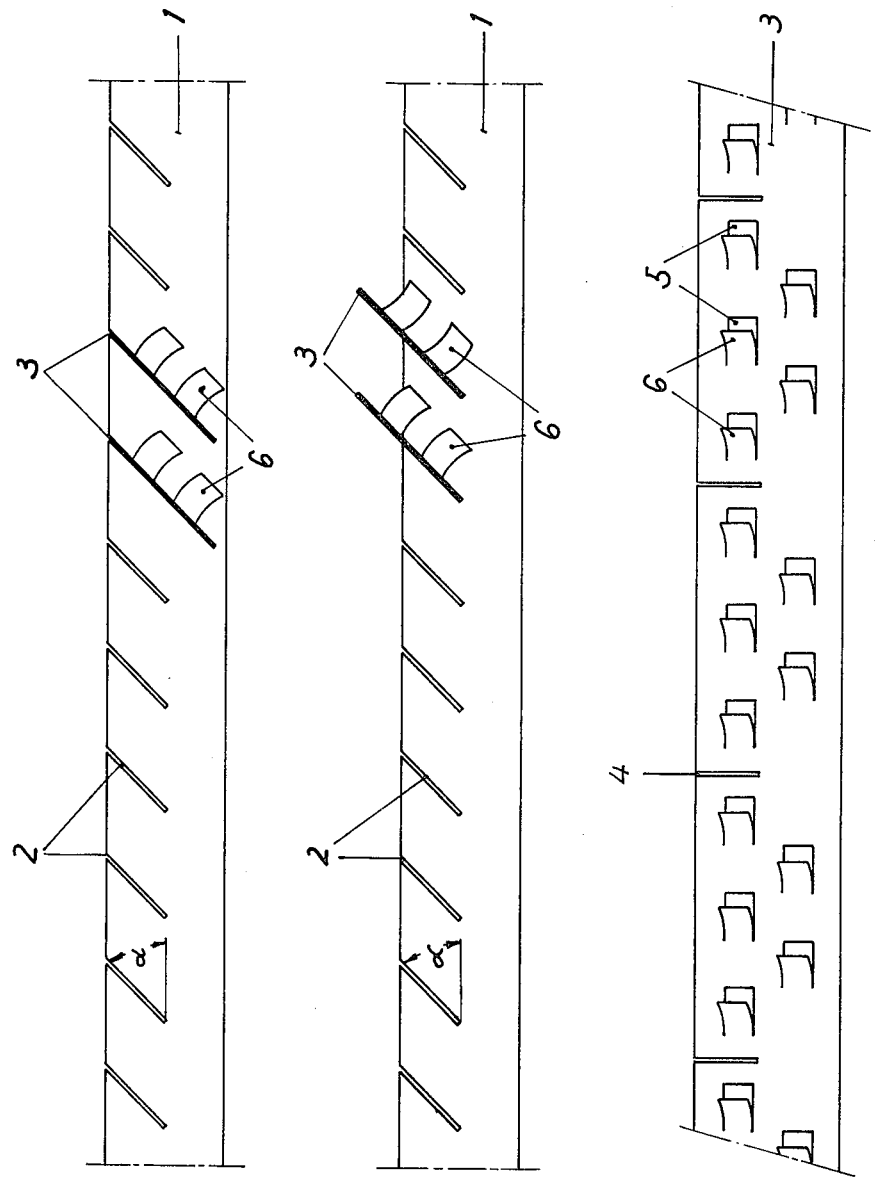

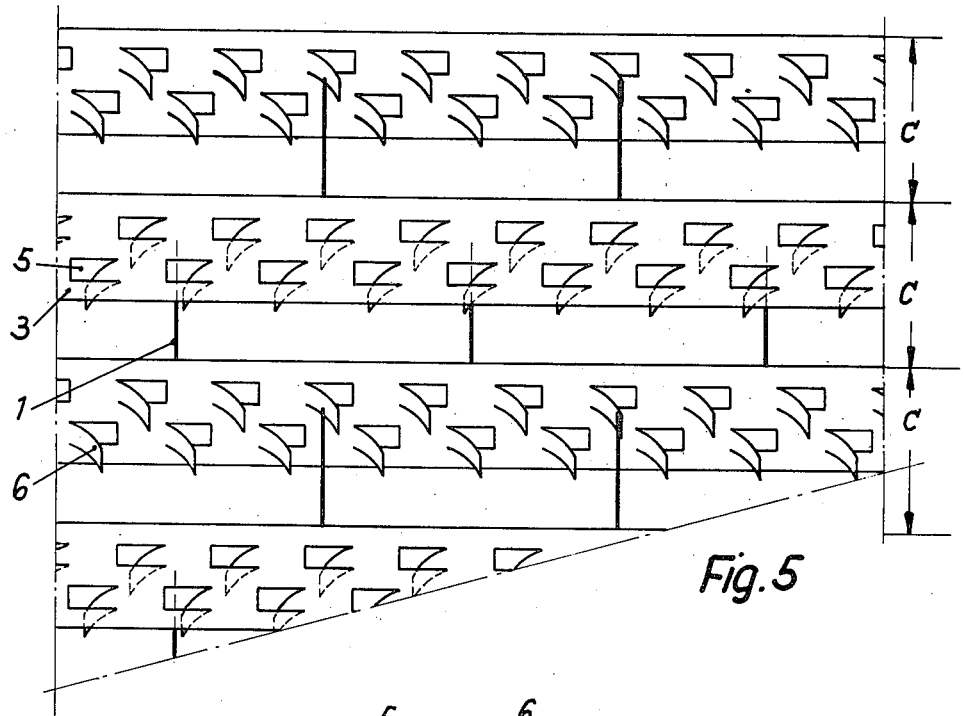
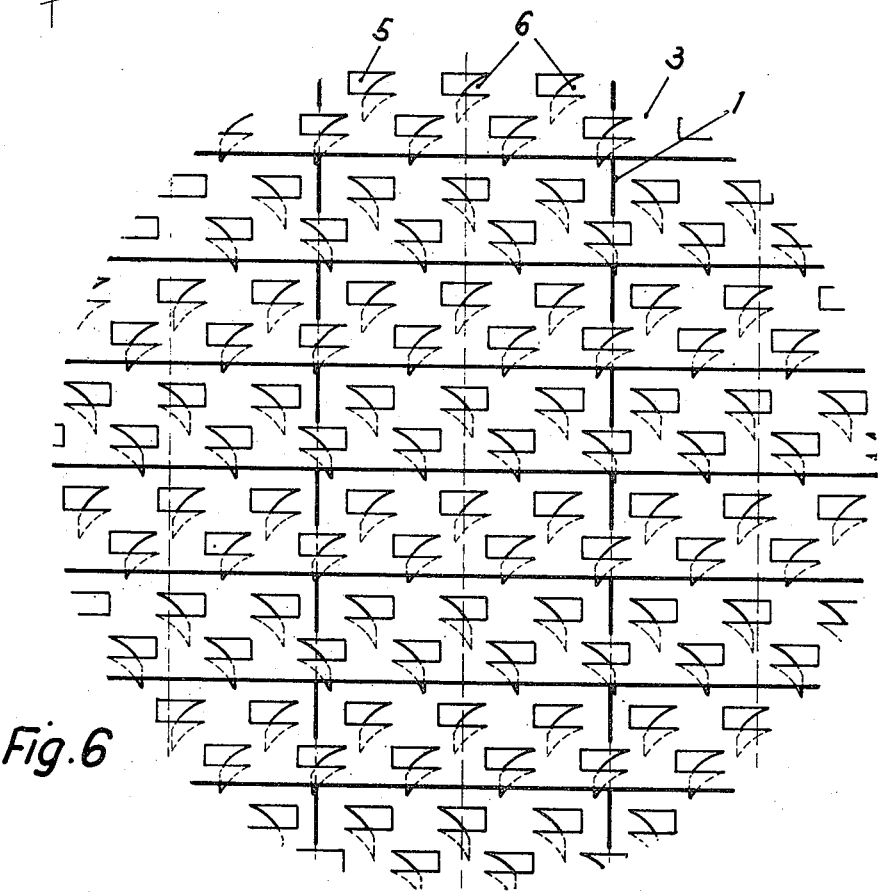

CONTACTING ARRANGEMENT FOR MASS TRANSFER OPERATIONS

This invention relates to a regular contacting arrangement for mass transfer operations, in which rising vapor streams flow countercurrent to liquid which trickles down and wets wall surfaces and are subjected to a plurality of changes in direction. Such contacting arrangements are used, e.g., in distillation and absorption columns.

Packed columns contain irregular packing, in which the liquid moves with irregular changes in direction and in liquid films of varying thickness over the packing elements. Regular contacting arrangements used in so-called wetting columns provide for more uniform films which flow down the walls and contact vapors flowing in a controlled countercurrent pattern. In a wetting column having a regular contacting arrangement, uniform quantitative proportions of the phases in contact with each other can be achieved in a closer approximation. In such contacting arrangements it is known to provide longitudinal passages having cross-sections which vary in the direction of flow. This is accomplished by the use of corrugated plates which are staggered so that crests of one plate register with troughs of an adjacent plate (German Patent Specification No. 1,059,888 and Printed Application No. 1,089,728). This arrangement results in a continual acceleration and retardation of the vapor streams so that an undesirably high pressure drop results. Besides, the constrictions impose a limit on the highest permissible vapor velocity so that the contacting arrangements must be fairly bulky.

Another regular contacting arrangement for use in columns has been disclosed in Opened German Specification No. 1,544,027 and consists of gridlike struts, which constrict the vapor flowing therethrough so that an undesirably high pressure drop in the gas stream results. Other regular contacting arrangements for use in columns consist of horizontal metal plates, which are formed with angled or rounded corrugations and with apertures (Printed German Specifications Nos. 1,129,956 and 1,667,050). These arrangements also inevitably involve a relatively high pressure drop because the areas of the openings must not exceed a certain limit for reasons of stability. Besides, the punched-out portions of sheet metal are wasted and are not available for the mass transfer. In the arrangements described, a substantial part of the volume of the equipment is disposed outside the main streams so that these arrangements do not enable a mass transfer with optimum efficiency. Another arrangement has been disclosed in Opened German Specifications Nos. 2,060,178 and 2,233,763 and is made from sheet metal having shaped perforations or from expanded metal or from a fabric which is structurally similar to expanded metal. The use of these materials adds considerably to the costs of a regular contacting arrangement made therefrom for use in a column. This shows that this arrangement is not very competitive.

The regular contacting arrangement according to the invention comprises parallel longitudinal strip plates, which extend transversely to the flow passage and have oblique slots, and transverse striplike plates, which extend through said slots and are transverse to the longitudinal striplike plates. The longitudinal and/or transverse strip plates have holes and/or slots and the longitudinal and transverse strip plates extend one through another and are connected to form superimposed grates. The longitudinal and/or transverse strip plates extend at same oblique angles to each other in each grate, whereas the longitudinal and/or transverse strip plates of adjacent grate are oblique to each other in opposite senses. The strip plates may consist of metal or of plastics material. When made from plastics material the longitudinal and transverse strips of each grate may consist of an integral injection molding of plastics material.

In a mass transfer column, the regular contacting arrangement according to the invention ensures that all surfaces available for mass transfer are approximately uniformly wetted and the entire cross-section is flown through by the gases without stagnant spaces so that the mass transfer is maximized in spite of a low pressure drop in the gas stream. The holes which are provided result in an equalization of differences in concentration and pressure in a horizontal direction. In the selected arrangement, the lugs struck out from said holes are arranged to provide for a horizontal flow which changes at adjacent strips and in adjacent grates. These holes and the lugs struck out therefrom cooperate also to increase the general turbulence and to reduce the pressure drop whereas the surface area available for mass transfer is not decreased. Besides, the regular contacting arrangement according to the invention can be made at low cost and can easily be installed even into existing columns because it is sufficient to stack the grates whereas there is no need for additional structures in the column.

Embodiments of systematic contacting arrangements according to the invention are shown diagrammatically and by way of example in the drawings, in which FIG. 1 is a perspective view showing longitudinal and transverse strip plates joined to form a grate and shown without apertures, for greater simplicity.

FIGS. 2 and 3 are corresponding side elevations of the grate of FIG. 1 in views taken on the longitudinal strips, into which some of the transverse strips have been inserted. Holes of the transverse strips are also indicated.

FIG. 4 is an elevation showing an apertured transverse strip.

FIGS. 5 and 6 are a side elevation and top plan view showing grates consisting of longitudinal and transverse strips having alternating orientations.

Figure 1:
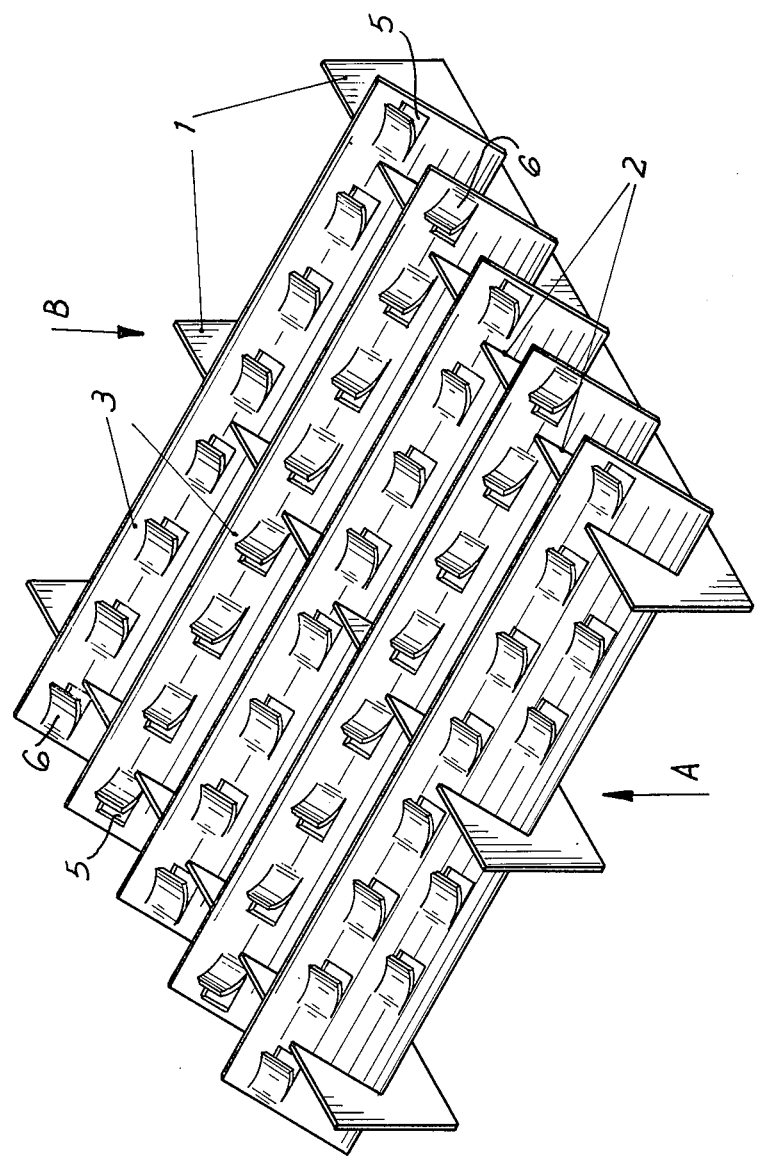

As is apparent from the drawings the systematic contacting arrangement comprises parallel longitudinal strip plates 1, which are transverse to the vapor flow passage A and the liquid flow passage B in a column. The strip plates 1 have oblique slots 2. Transverse strip plates 3 extend through said oblique slots transversely to the longitudinal strip plates 1. The transverse strip plates may be provided with mating slots 4 and are provided with holes 5 and with lugs 6 struck out from said holes. The holes 5 and the lugs 6 struck out therefrom are not shown in the perspective view for the sake of simplicity. In the arrangement shown in FIG. 2, the longitudinal strips 1 have oblique slots 2 and the transverse strips 3 have mating slots 4 (FIG. 4). In the arrangement shown in FIG. 3. Only the longitudinal strips 1 have oblique slots 2 whereas the transverse strips 3 have no mating slots so that they are inserted to a smaller depth than in FIG. 2. FIGS. 2 to 4 show also the holes 5 and the lugs 6 struck out therefrom.

When grates consisting of longitudinal strips 1 and transverse strips 3 are stacked, the longitudinal strips 1 are preferably vertical and the transverse strips 3 of adjacent grates are suitably inclined in mutually opposite directions to define zig-zag flow passages A/B. The transverse strips 3 may be inclined at an angle between 15° and 75°. Alternatively, the longitudinal strips 1 may be inclined although the manufacture will be more difficult in that case. As is shown in FIGS. 2 and 3, the slots 2 and 4 permit of an insertion of the longitudinal strips 1 and transverse strips 3 into each other to different depths between 30% and 100%. The lugs 6 struck out from the holes 5 of adjacent grates may be angled from the adjoining strips in alternating senses, as is shown in FIGS. 5 and 6, and at angles between 30° and 90°.

The intersecting longitudinal strip plates 1 and transverse strip plates 3 constitute a composite grate C, as is shown in FIG. 5. This arrangement is particularly suitable for strip plates of metal. Alternatively, longitudinal strip plates 1 and transverse strip plates 3 may be injection-molded from plastics material to form an integral grate.

What is claimed is:

1. A contacting arrangement for mass transfer operations, which comprises
    a plurality of stacked contacting grates, each of which comprises a set of laterally spaced apart, parallel first strips which are transverse to vapor and liquid flow passage, the vapor being countercurrent to the liquid flow, and a set of laterally spaced apart second strips, each of which has a longitudinal direction which is transverse to the longitudinal direction of said first strips of the same grate,
    each of said second strips having at right angles to its longitudinal direction a direction which includes an oblique angle with the longitudinal direction of said first strips of the same grate,
    said oblique angle being in the same sense for all said second strips of a grate and being in opposite senses for the second strips of adjacent grates, whereby said second strips of all said grates define zig-zag flow passages,
    each strip of each of said sets intersecting all strips of the other set of the same grate,
    the strips of at least one of said sets, having holes and struck-out lugs adjacent of said holes, for increasing the general turbulence available for mass transfer, as well as reducing the pressure drop therein, said lugs of adjacent grates being angled from said strips of at least one set in opposite senses,
    said second strips repeatedly deflecting the vapor rising between said second strips, and said second strips being wetted by the liquid flowing countercurrent to the vapor and in contact therewith,
    each of said first strips is formed with slots which are spaced apart in the longitudinal direction of said strip, and include an oblique angle with its longitudinal direction and said second strips extending through said slots.

2. A contacting arrangement as set forth in claim 1, in which
    each of said second strips is formed with slots which are spaced apart in the longitudinal direction of said strip, and
    said first strips extend through said slots.

3. A contacting arrangement as set forth in claim 1, in which
    said second strips are parallel to each other, and
    said oblique angle is in the range of 15° to 75°.

4. A contacting arrangement as set forth in claim 1, in which each strip of each of said sets intersects all strips of the other set to an extent of 30% to 100% of the width of said strip.

5. A contacting arrangement as set forth in claim 1, in which each of said lugs forms with the adjoining strip an angle of 30% to 90%.

6. A contacting arrangement as set forth in claim 1, in which the longitudinal directions of said first and second strips of one of said grates differ from the longitudinal directions of said first and second strips, respectively, of an adjacent one of said grates.

* * * * *